Oct. 18, 1938.  E. EGER  2,133,438

APPARATUS FOR SLITTING TIRE TREADS

Filed Oct. 30, 1936  2 Sheets-Sheet 1

INVENTOR.
ERNST EGER
BY
ATTORNEY.

Oct. 18, 1938.　　　　　E. EGER　　　　　2,133,438
APPARATUS FOR SLITTING TIRE TREADS
Filed Oct. 30, 1936　　　2 Sheets-Sheet 2
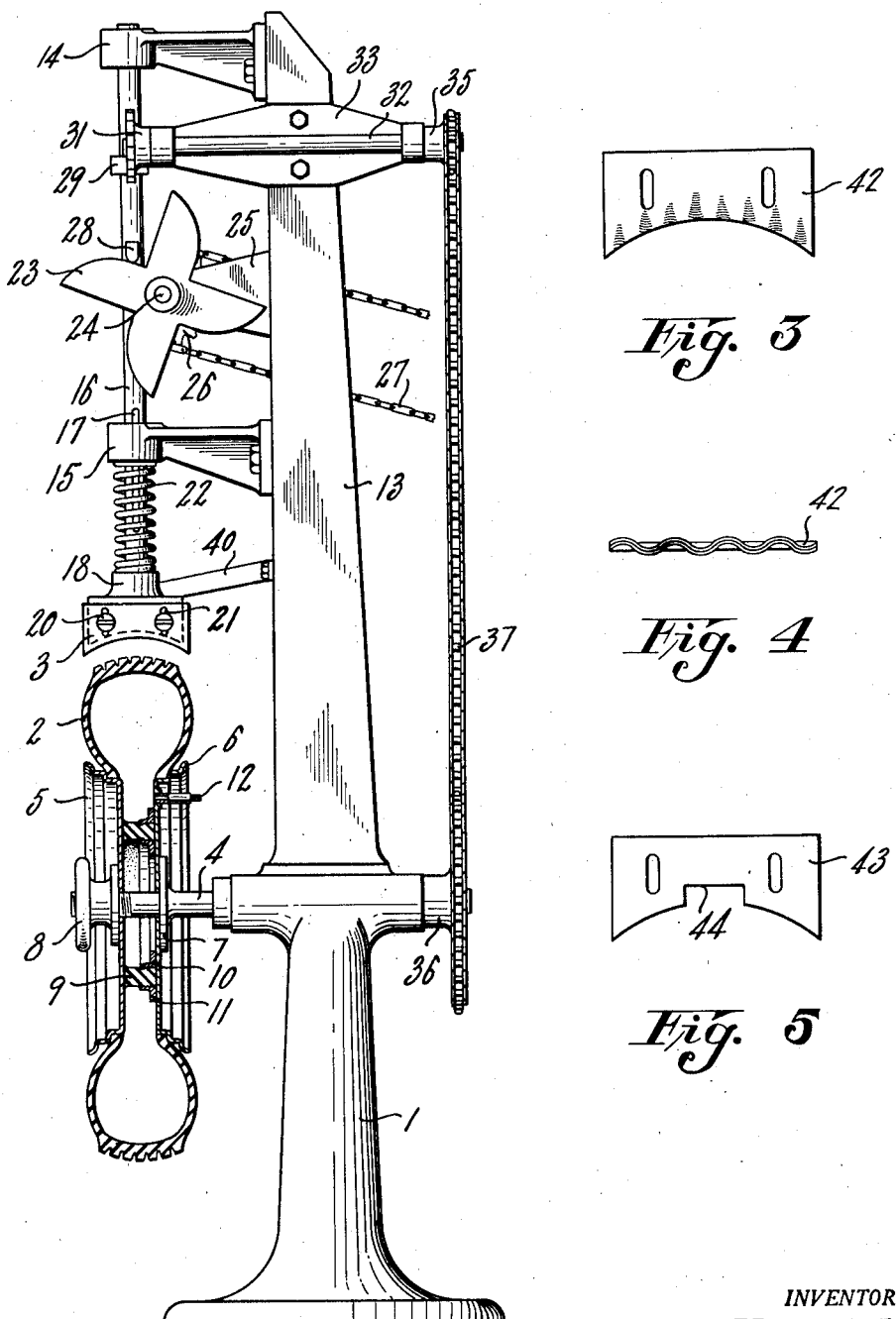
INVENTOR.
ERNST EGER
BY
ATTORNEY.

Patented Oct. 18, 1938

2,133,438

UNITED STATES PATENT OFFICE 2,133,438

APPARATUS FOR SLITTING TIRE TREADS

Ernst Eger, Grosse Pointe Park, Mich., assignor to United States Rubber Products, Inc., New York, N. Y., a corporation of Delaware Application October 30, 1936, Serial No. 108,442

13 Claims. (Cl. 164—48)

This invention relates to pneumatic tires, and in particular it relates to apparatus for slitting the treads of such tires. For the purpose of improving the antiskid qualities and increasing the wearing qualities of pneumatic tires, it has been found desirable to make small transverse slits in the tread surfaces of such tires without substantially removing any rubber from the tread surfaces while providing such slits.

Heretofore pneumatic tires to be cross slitted have been treated by drawing a knife or rotary cutter transversely of the treads of the tires. In general, the invention consists of means for supporting an inflated tire, and one or more knife blades disposed substantially in a radial plane relative to the tire and crosswise of its tread in position for a quick release and movement against the tread portion of the tire to deliver a cutting blow.

By providing incisions in the tread of a tire by a knife operating with a cutting blow substantially in a radial plane, the cutting movement of the knife for a given depth of the slit is relatively short. Furthermore, the knife blade may be made to conform to various shapes of tires so as to be more suitable for controlling the desired slit formation in the tire tread.

An object of the invention is to provide slits in the tread of a tire by means of a cutter adaptable for movement in a substantially radial plane.

Another object is to provide an apparatus for expeditiously producing incisions in a tire tread.

These and other objects and advantages will appear more fully in the following detailed description when considered in connection with the accompanying drawings, in which:—

Fig. 2 is a side elevational view thereof, partly in section;

Fig. 3 is a side view of a modified form of knife blade;

Fig. 4 is an end view thereof; and

Fig. 5 is a side view of a further modification of the knife blade.

Figure 1:
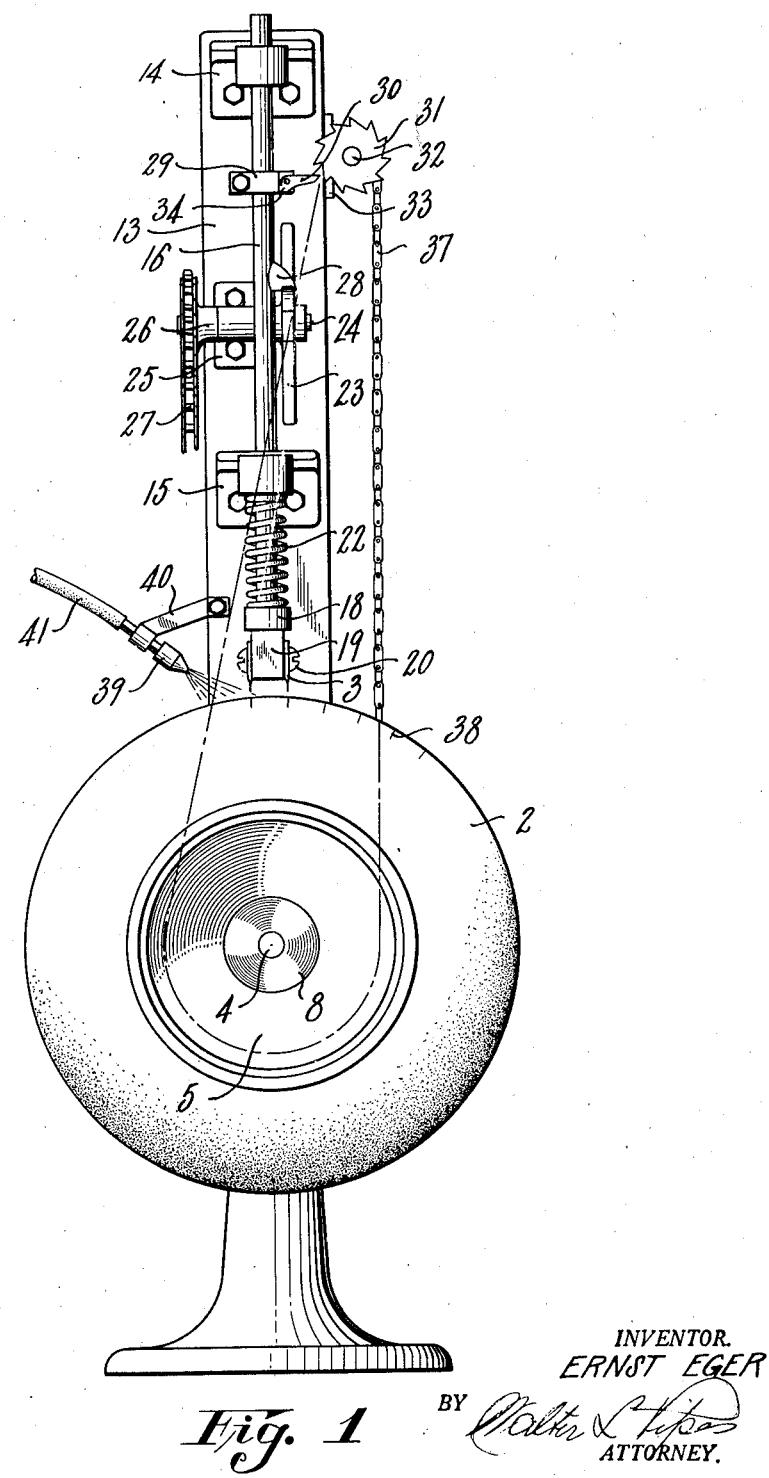
Fig. 1 is a front elevational view of an embodiment of the invention.

Referring to the drawings, and in particular to Figs. 1 and 2, an embodiment of the invention is shown comprising a pedestal 1 for supporting a tire 2, and means for actuating one or more knife blades 3. The tire 2 is supported from the pedestal 1 by means of a horizontally disposed shaft 4 and rim flanges 5 and 6. The rim flanges 5 and 6 are provided with double seats for tire beads so that different sizes of tires can be fitted to the same rim flanges. The rim flange 6 rests against a flange 7 extending from the shaft 4, and the rim flange 5 is held in place by a hand operated nut 8.

In the practice of the present invention, it is desirable to inflate the tire before incisions are made in the tread in order to resist the impact of the knife blades. As the tire is inflated temporarily, it is found unnecesary to utilize a conventional inner tube. The tire beads as they rest against the seats of the rim flanges 5 and 6 provide an adequate temporary seal. In order to seal the rim flanges 5 and 6 a rubber gasket 9 is provided. This gasket is secured in place on the rim flange 6 by retaining rings 10 and 11. An air inlet, illustrated as a valve stem 12, communicates with the tire chamber through the rim flange 6.

Means for supporting the knife blade 3 and its associated mechanism comprises a structural member 13 extending from the pedestal 1, and brackets 14 and 15 projecting therefrom. A vertical shaft 16 adaptable for reciprocal movement in a radial plane relative to the tire 2 is slidably mounted in the hubs of the brackets 14 and 15. A key 17 secured to the shaft 16 cooperates with a keyway in the hub of the bracket 15 for preventing rotary movement of the shaft 16.

Secured to the lower end of the shaft 16 is a flange 18 which provides means to which a knife support 19 is attached. The cutter blades 3 are attached to the blade support 19 by means of machine screws 20. Slots 21 in the knife blades 3 permit vertical adjustment of the blades relative to support 19 for determining the depth of the incision in the tire.

A spring 22 surrounding the shaft 16 is positioned between the flange 18 and the hub of the bracket 15. This spring is relatively stiff and is adapted to urge the knife blades 3 in the direction of the tire 2. To elevate the blades 3 relative to the tire 2, a cam 23 is provided. This cam is attached to a shaft 24 rotatably supported in a bracket 25 extending from the structural member 13. At the opposite end of the shaft 24 a sprocket 26 is secured, and a chain 27 which engages therewith extends to a source of power for providing a relatively slow, continuous movement.

A lug 28 extending from the shaft 16 engages with the cam 23, and as the cam rotates the lug 28 is moved upwardly until an end of the cam passes the lug 28, leaving same free to drop in a vertical movement actuated by the spring 22. Thereafter another portion of the cam 23 engages with the lug 28 and a similar cycle of operation occurs.

A clamp lug 29 is secured to the shaft 16 for pivotally supporting a pawl 30. A ratchet wheel 31, mounted on a shaft 32 supported from a bracket 33 which is attached to the structural member 13, is positioned in complementary relation with the pawl 30. On the upward stroke of the shaft 16 the pawl 30 engages one of the teeth of the ratchet wheel 31, thus imparting increments of rotary motion to the ratchet wheel. A shoulder extending from the pawl 30 engages with a surface on the clamp lug 29 to hold the pawl in a rigid position during the upward movement of the shaft 16. As the shaft moves downwardly the pawl pivots and rides over the teeth of the ratchet wheel 31.

A sprocket 35 is secured to the shaft 32 at the opposite end of the ratchet wheel 31. A sprocket 36 is also secured to the shaft 4 for supporting the tire 2. A chain 37 meshes with the sprockets 35 and 36, thus imparting increments of rotary motion to the tire 2 in accordance with movement of the ratchet wheel 31. Therefore, after incisions are made in the tread of the tire, the tire is moved a predetermined distance circumferentially upon the upward movement of the shaft 16, so that incisions 38 in the tread of the tire 2 may be properly spaced around the circumference of the tread. If desired, the teeth of the ratchet wheel 31 may be irregularly spaced, thus resulting in irregularly spaced slits 38 in the tread of the tire 2.

In order to facilitate the cutting operation it is desirable to provide a lubricant at the surface of the tire tread. An effective lubricating means is provided in the form of a nozzle 39 held in position by a bracket 40 secured to the structural member 13. A flexible hose 41 connects the nozzle 39 with a supply of lubricant and air pressure. In this way a film of lubricating fluid is sprayed over the surface of the tread prior to the formation of the incisions. Water may be used effectively as a lubricant; however, a lubricant in the form of a soap solution is preferred.

The knife blades 3 are so mounted as to form incisions in the tread transversely of the tire. It is to be understood, however, that these incisions may be angularly disposed instead of being positioned transversely of the tire tread. In addition, the arc or curvature formed in the cutting edge of the blade may be of different curvatures relative to the profile of the tread. For example, the knife blades may be so designed that they will cut deeper at the shoulder portions of the tread than at the central portion.

Figs. 3 and 4 illustrate a modified form of cutting blade. This modification shows a blade 42 having an undulated cutting edge. As the incisions are made by a direct vertical impact of the knife, the blade may conform to various configurations.

In Fig. 5 a further modification of the cutting blade is shown. This figure illustrates a blade 43 having a recess 44. Such a modified form of blade may be used where only certain portions of the tread are to be slit. For example, some of the ribs adjacent the shoulder portion of the tread may be slit, leaving the central portion of the tread uncut.

While in the present embodiment two blades have been shown for producing incisions in the tread of a tire, it is to be understood that one or a plurality of blades may be utilized with various degrees of effectiveness, and that different combinations of blades may be utilized to produce slits of different configurations relative to adjacent slits.

In the operation of the apparatus, the hand nut 8 and the rim flange 5 are removed from the shaft 4. A tire is placed in position on the rim flange 6 and the rim flange 5 and hand nut 8 are replaced. As the hand nut 8 is tightened, the rim flange 5 is forced against the sealing gasket 9 so as to form a substantially air tight chamber with the tire. The tire is then inflated through the valve stem 12 to a pressure of about ten pounds. It is quite probable that leakage will occur at the point where the tire beads seat with the rim flanges. Such leakage, however, is relatively slow, and the slitting operation is completed before the pressure within the tire is materially reduced.

After the tire is properly inflated, means for lubricating the tire is set into operation, power means for rotating the cam 23 is started, and the vertical shaft 16 is elevated. At the end of the cam stroke, the vertical shaft 16 assisted by the spring 22 drops downward in a quick movement, the impact of which is sufficient to produce radial cuts or incisions in the tread of the tire. As the cam 23 continues to rotate, the vertical shaft 16 is again moved upwardly. This upward movement, through the pawl 30 and the ratchet wheel 31, rotates the tire 2 so that when the knife blades again descend upon the tread, the tire is moved circumferentially forward so that the slits are properly spaced relative to the preceding incisions.

This cycle of operation continues until the slits 38 are properly spaced throughout the entire circumference of the tire. When the slitting operation is completed, the operator shuts off the source of power for driving the cam 23, and the tire 2 is deflated and removed from the rim flanges.

While I have shown a present preferred embodiment of my invention, it is to be understood that the invention may be otherwise embodied within the spirit thereof and the scope of the appended claims.

Having thus described my invention, what I claim and desire to protect by Letters Patent, is:—

1. In an apparatus for slitting treads of pneumatic tires, means for rotatably supporting a tire, cutting means comprising a support and a cutter blade attached to said support, a cam for moving the support radially away from the tire, and a spring operable for moving the support radially toward the tire.

2. In an apparatus for slitting treads of pneumatic tires, means for rotatably supporting a tire, cutting means comprising a support and a cutter blade attached to said support, means for moving the support radially away from the tire, additional means for moving the support radially toward the tire, and driving means actuated by the support moving means for intermittently imparting motion to the tire supporting means.

3. In an apparatus for slitting treads of pneumatic tires, means for rotatably supporting a tire, cutting means comprising a support and a knife blade attached to the support, a continuously rotating driving cam for moving the support away from the tire, a spring for returning the support toward the tire, and driving means actuated by the support moving means during its movement away from the tire for intermittently imparting motion to the tire supporting means.

4. In an apparatus for slitting treads of pneumatic tires, means for rotatably supporting a tire, cutting means comprising a support and a knife blade attached to the support, a continuously rotating driving cam for moving the support away from the tire, a spring for returning the support toward the tire, a pawl pivoted to the support, and a ratchet wheel engageable with the pawl for intermittently imparting motion thereto.

5. In an apparatus for slitting treads of pneumatic tires, means for rotatably supporting a tire, cutting means comprising a support and a knife blade attached to the support, a continuously rotating driving cam for moving the support away from the tire, a spring for returning the support toward the tire, a pawl pivoted to the support, a ratchet wheel engageable with the pawl for intermittently imparting motion thereto, and means connecting the ratchet wheel with the tire supporting means.

6. In an apparatus for slitting treads of pneumatic tires, means for rotatably supporting a tire, cutting means comprising a support and a knife blade attached to the support, a continuously rotating driving cam for moving the support away from the tire, a spring for returning the support toward the tire, a pawl pivoted to the support, and a ratchet wheel having irregularly spaced teeth engageable with the pawl for intermittently imparting motion thereto.

7. In an apparatus for slitting treads of pneumatic tires, a cutting means adaptable for forming incisions in the treads of tires, and a tire supporting means comprising a shaft, a pair of separate tire supporting flanges mounted on the shaft, a sealing gasket between the flanges, and means for holding the flanges against the sealing gasket.

8. In an apparatus for slitting treads of pneumatic tires, cutting means adaptable for forming incisions in the treads of tires, and a tire supporting means comprising a shaft, a pair of separate tire supporting flanges mounted on the shaft, a sealing gasket between the flanges, means for holding the flanges against the sealing gasket, and a valve stem attached to one of the flanges and forming a communicating aperture therethrough.

9. In an apparatus for slitting treads of pneumatic tires, means for rotatably supporting a tire, cutting means comprising a support and at least one knife blade attached to the support and adaptable for movement against the tread of the tire in a substantially radial manner, the cutting edge of said knife conforming substantially to the transverse profile of the tire tread.

10. In an apparatus for slitting treads of pneumatic tires, means for rotatably supporting a tire, cutting means comprising a support and at least one knife blade attached to the support and adaptable for movement against the tread of the tire in a substantially radial manner, the cutting edge of said knife having a radius of curvature less than the radius of curvature of the transverse profile of the tire tread.

11. In an apparatus for slitting treads of pneumatic tires, means for rotatably supporting a tire, cutting means comprising a support and at least one knife blade attached to the support and adaptable for movement against the tread of the tire in a substantially radial manner, the cutting edge of said knife conforming in part to the transverse profile of the tire tread.

12. In an apparatus for slitting treads of pneumatic tires, means for rotatably supporting a tire, cutting means comprising a support and at least one knife blade attached to the support and adaptable for movement against the tread of the tire in a substantially radial manner, the cutting edge of said knife conforming substantially to the transverse profile of the tire tread and forming a sinusoidal path.

13. In an apparatus for slitting treads of pneumatic tires, means for rotatably supporting a tire, cutting means comprising a support and at least one knife blade attached to the support and adaptable for movement against the tread of the tire in a substantially radial manner, the cutting edge of said knife conforming substantially to the transverse profile of the tire and forming an irregular path.

ERNST EGER.